Feb. 28, 1956 P. EISLER 2,736,677

METALLIZED INSULATORS

Filed Nov. 29, 1951 4 Sheets-Sheet 1

Inventor
Paul Eisler

By Watson Cole, Grindle & Watson
Attorney

METALLIZED INSULATORS

Filed Nov. 29, 1951 4 Sheets-Sheet 2

Inventor
Paul Eisler

By Watson, Cole, Grindle & Watson
Attorney

Feb. 28, 1956

P. EISLER 2,736,677

METALLIZED INSULATORS

Filed Nov. 29, 1951

4 Sheets-Sheet 3

Inventor
Paul Eisler

By Watson, Cole, Grindle & Watson
Attorney

Feb. 28, 1956 P. EISLER 2,736,677

METALLIZED INSULATORS

Filed Nov. 29, 1951 4 Sheets-Sheet 4

Inventor
Paul Eisler

By Watson, Cole, Grindle & Watson
Attorney

United States Patent Office 2,736,677
Patented Feb. 28, 1956

2,736,677

METALLIZED INSULATORS

Paul Eisler, London, England, assignor to Technograph Printed Circuits Limited, London, England, a British company Application November 29, 1951, Serial No. 258,807
Claims priority, application Great Britain December 1, 1950
10 Claims. (Cl. 154—127)

The present invention relates to metallised insulators, that is to say articles each comprising an insulating body having a metal body secured to it. Included within the scope of the term "metallised insulators" are certain terminal assemblies, seals and bushes used in electrical equipment, and some forms of the so-called "printed circuits." A particular class of metallised insulators comprises the hermetic seals and bushes which serve to lead electric condudctors into or out of hermetically sealed vessels. The walls of the vessel are usually metallic and earthed, and the electric conductor must consequently be guided through these walls by an insulator which is to be joined to the wall and to the conductor in a way which will ensure a hermetic seal. The insulator must hold the conductor firmly and position it accurately, particularly when a high voltage exists between the conductor and the earthed wall of the vessel.

Such seals or bushes usually comprise a glass, ceramic, or similar body, which is provided on certain of its areas with a strongly adherent metallic coating applied by a high temperature metallisation process, to which coating metallic connections can be made, for instance by soldering. Alternatively a metal rod or other conductor is sealed directly into the insulating body. The insulating materials are generally glass or ceramics, although certain laminated fibrous materials impregnated with plastic or elastomeric substances such as impregnated glass fibre, asbestos, paper or cloth, would also be suitable insulators and might even be preferable in some cases for various reasons, for instance, ease of fabrication, elasticity, flexibility, and machinability. However, it is believed that it has not hitherto been possible to make satisfactory hermetic seals between such laminated insulating materials and metals.

It is an object of the present invention to provide a metallised insulator in which a satisfactory seal between the metal and the insulating material is achieved and in which laminae are used for forming the insulating body.

According to one aspect of the present invention a method of making a metallised insulator comprises forming in a desired configuration a stack of mutually interleaved metal laminae and insulating laminae such that parts of the metal laminae are not covered by insulating laminae and vice versa, and treating the stack so as to unite the parts of the metal laminae that are not covered by insulating laminae and to unite the parts of the insulating laminae that are not covered by metal laminae.

This method of making a metallised insulator provides a labyrinthine contact between the metal and insulating portions, and owing to the uniting together of the metal laminae and insulating laminae respectively, an effective hermetic seal is achieved.

According to another aspect of the invention a metallised insulator with labyrinthine contact between the metal and the insulator comprises an insulating body formed from insulating laminae united together over part of their areas and interleaved over the remainder of their areas by parts of metal laminae, and a metal body formed from the remaining parts of the metal laminae united together.

Perforations in the metal laminae or the insulating laminae or both improve the sealing between metal and insulation, since the adjacent laminae on both sides of a perforated lamina can be united also through the perforation or perforations in the latter.

Usually, in a seal or lead-through terminal embodying the invention, there will be two metallic bodies secured to opposite sides of an insulating body, there being labyrinthine contact between the two metallic bodies and the insulating body as above described.

The invention may be carried into practice in a wide variety of ways, but some specific examples of methods of manufacture will be described by way of illustration with reference to the accompanying diagrammatic drawings, in which:

Figures 1 to 3 form a group illustrating a method of forming a bushing insulator having metal rings attached at both ends; in this group Figure 1 is a fragmentary perspective view showing the way in which the laminae are stacked, Figure 2 is a cross-section through the tubular stack shown in Figure 1 before heat treatment, and Figure 3 is a cross-section through the tubular stack shown in Figures 1 and 2 but after heat treatment.

Figures 4 to 8 form a group illustrating a method of forming a bushing insulator consisting of internal and external concentric metal rings spaced apart by an insulating ring; in this group Figure 4 is a view of one of the metal laminae which go to make up the inner metal ring, Figure 5 is a view of one of the metal laminae which go to make up the outer metal ring, Figure 6 is a view of an insulating lamina, Figure 7 is a cross-section through the stack of laminae before heat treatment, and Figure 8 is a cross-section through the finished insulator.

Figures 9 to 11 form a group illustrating the manufacture of metal and insulating laminae by a printed circuit technique, in this group Figure 9 is a cross-section through a coated metal foil prior to an etching process, Figure 10 is a cross-section through the foil after the etching process, and Figure 11 is a plan view of the coated foil.

Figure 1:
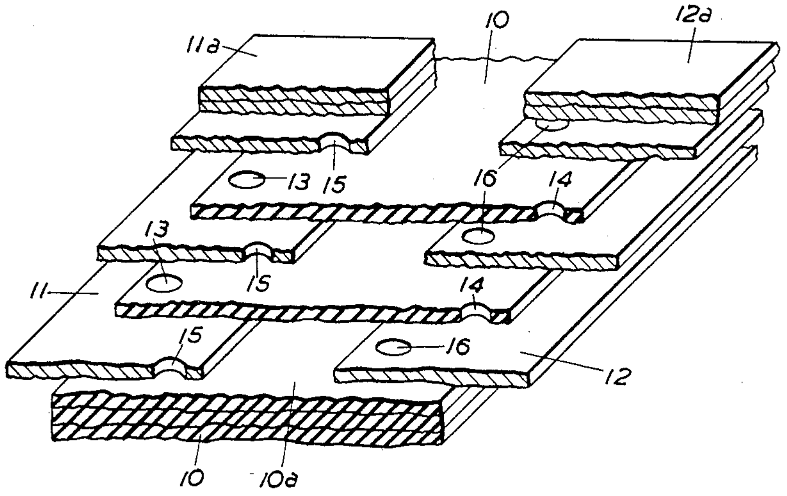

It will be understood that the accompanying drawings are all highly diagrammatic and that the proportions have been much distorted so that the principles of the invention can be seen more clearly. Thus the laminae in the drawings are much thicker in proportion to their other dimensions than would be the case in practice.

The method of manufacture to be described with reference to Figures 1 to 3 aims at producing a cylindrical bushing insulator having metal rings at both ends. One of the metal rings can be formed into or soldered to a flange which can in turn be soldered or otherwise secured to the wall of a vessel, or the ring can be soldered or otherwise secured directly to the wall. The other metal ring can be joined to a terminal cap carrying the conductor.

Figure 2:
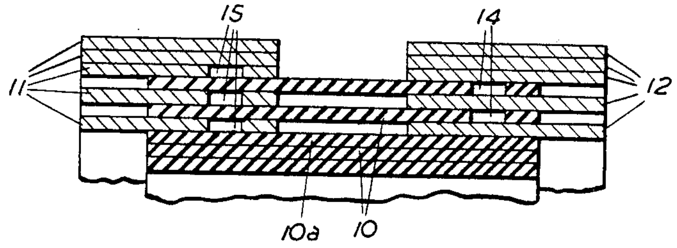

In forming the insulator a strip of paper 10 impregnated with an uncured or partly cured resin is first wound round a mandrel or former for a few turns, the outermost turn being shown at 10a in Figures 1 and 2. Tapes 11 and 12 of metal foil are then cemented to each side of the strip 10. The paper is perforated near its edges by perforations 13 and 14, while the inner edges of the foil tapes are perforated with perforations 15 and 16 respectively. The whole of the foil tapes, or at least those parts which project beyond the edges of the paper strip and the areas which lie beneath and over the perforations 13 and 14, are tinned or otherwise surface-treated to enable them to be readily soldered or brazed.

The paper strip and the metal foil tapes are wound on for several turns until an insulator of the required thickness has been built up. The foils are given a few more turns and the ends 11a and 12a are fastened temporarily, for instance by applying a soldering iron.

The rings of metail foil are now heat treated, for instance by swaging with a heated tool, so that in the areas where the foils are not interleaved by paper they are united solidly together.

The insulator is also subjected to a heat treatment for curing the impregnating resin of the paper strip so that the insulation is united together in the areas where the insulating laminae are not separated by metal foil.

Figure 3:
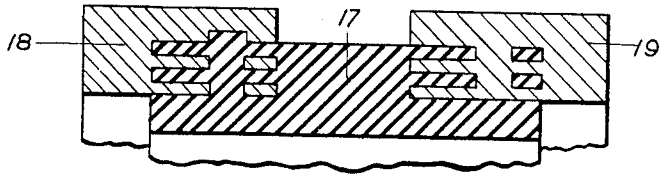

The result, as shown in Figure 3, is a solid insulating body 17 having metal rings 18 and 19 at its two ends. The contact areas between the insulating body 17 and the rings 18 and 19 are labyrinthine in character and owing to the integration of the laminae there is an effective seal between an insulating body 17 and the metal rings 18 and 19. The seal is enhanced by the cement by which the foils were secured to the paper strip, and by the winding tension. Mechanical interlocking of the insulation and the metal rings is provided by the perforations in the strip and in the foils. This interlocking not only assists the sealing but also enhances the mechanical strength of the insulator. Owing to the labryinthine nature of the contact areas between the metal and the insulator of the leakage path from the inside to the outside of the bushing is a meander round all the interleaved layers.

It has been mentioned that a temporary fastening of the wound metal foil is effected by applying a soldering iron to the outermost tubular layer. As such a fastening would not hold during a subsequent general heat treatment of the insulator it was stated that the heat treatment of the metal parts would be done by swaging with a suitable tool. However, if the outer layer of the tubular stack is initially secured in a manner which will remain effective under the temperature of the subsequent heat treatment, there is no need to use a tool for consolidating the metal parts, since the stack may be put into an oven or otherwise exposed to a general heat treatment or other process for uniting the laminae. Suitable initial fastenings for such purposes may be achieved, for example, by welding the metal foil outer layer at several points or along a seam. Such welding is nearly as easy as the soldering mentioned previously. Another example is mechanical fastening, for instance by making a slit in the outer layer, threading through the slit a flap formed in this layer, and turning the flap over. It is also possible to use other mechanical fastenings such as caps, rings, or tying wire or thread. Such fastenings can also be used for the insulating strip if, as is the case in some form of metallised insulators, the insulation forms the outside tubular ring.

It is possible to carry out the above described operations automatically, and, indeed, to provide an "automat," i. e. a machine which is supplied with reels of metal foil and insulating tape and which will wind and interleave the strips into stacks, perforate the strips as required during the feeding or winding operations, fasten the outside layers in a heat resisting manner, and then eject the stacks on to a conveyor belt which takes them through an infrared oven, a cooling chamber and a testing device. The "automat" could be adjustable for making various sizes and types of insulator. Thus one feature of the present invention is that automatic manufacturing operations are possible so that a high output is obtainable with a minimum of human labour.

In a larger type of "automat" several bushings can be wound simultaneously on one axis by using several strips of paper side by side, and (except at the outer edges of the outermost paper strips) foil tapes of roughly double the width of tapes which would be used for a single component, each of the double width tapes having perforations adjacent to both its edges. These double width foil tapes bridge adjacent strips of impregnated paper. The resulting cylinder is parted off in the centres of the double-width foil tapes. This multiple method of manufacture can also be carried out on a slitting and perforating machine and without appreciable loss of material, using as the stock wide reels of impregnated paper and metal foil.

As indicated above it is not necessary to tin the metal foil all over, but only on those areas where the foils are to be united to other foils. This could be achieved by pre-tinning the foils on one side only and then tinning only the exposed parts of the other side while the winding is in progress, using the paper as a mask or stencil.

The method of manufacture described with reference to Figures 1–3 can readily be modified for the production of bushing insulators of other shapes, for instance conical. In such cases it would be necessary to use paper strips and foil tapes cut along the curves of the development of the conical surface into a plane.

In the embodiment of the invention shown in Figures 4–8 another cylindrical bushing insulator is produced, but in this case the metal parts are in the form of internal and external concentric sleeves.

Figures 4, 5, 6, 7, 8:
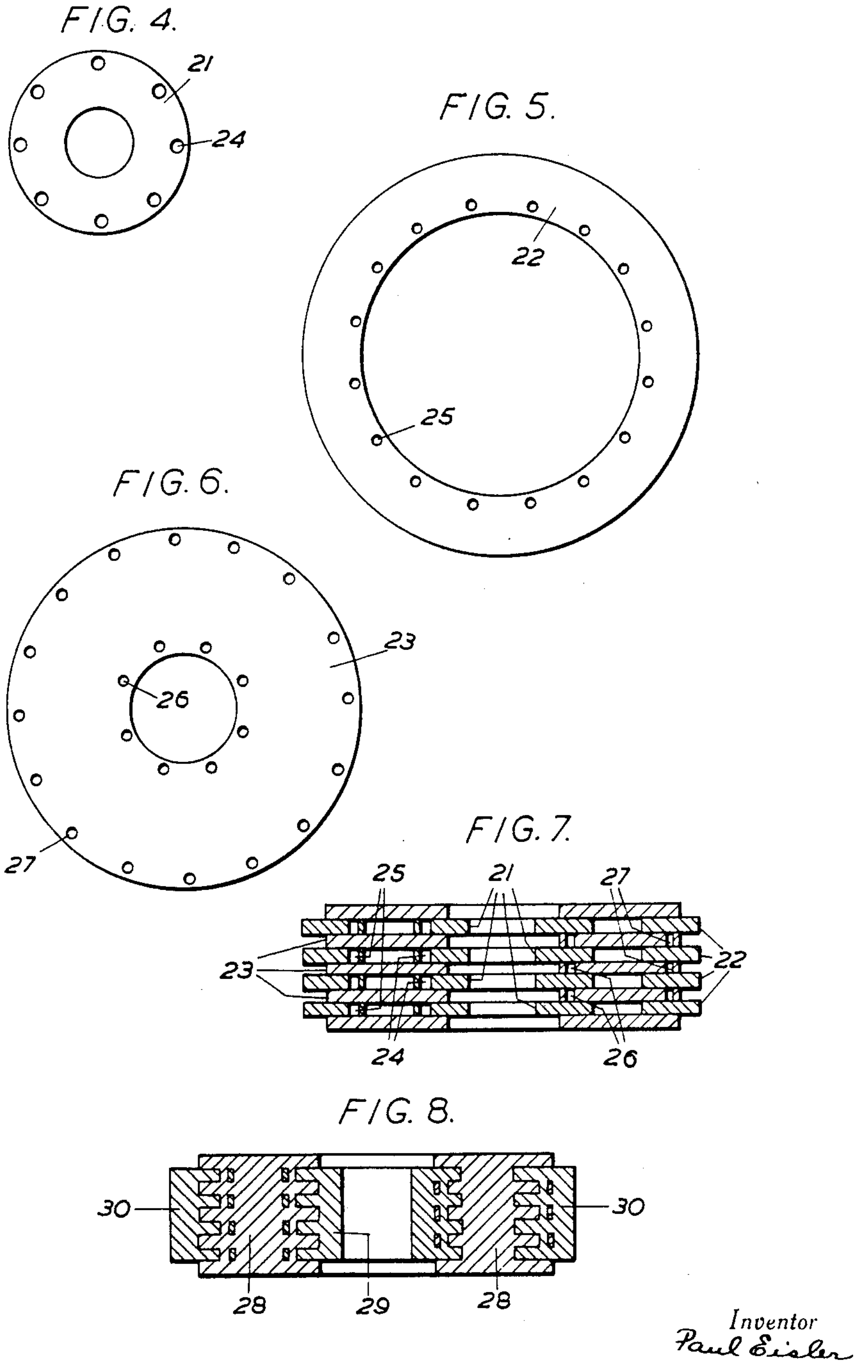

First of all sets of laminae of three different shapes are produced. Thus there are small annular metal laminae 21 as shown in Figure 4 for forming the inner sleeve, large annular metal laminae 22 as shown in Figure 5 for forming the outer sleeve, and annular insulating laminae 23 as shown in Figure 6 for forming the insulating body. The metal laminae may be made from metal foil tinned on both sides. The material for the insulating laminae 23 may be, for example, thin glass fibre cloth impregnated with an uncured or partly cured resin. The small metal laminae 21 have perforations 24 near their outer edge, the large metal laminae 22 have perforations 25 near their inner edge, while the insulating laminae 23 have perforations 26 near their inner edge and perforations 27 near their outer edge. The dimensions of the laminae are such that when they are arranged concentrically there will be a substantial annular gap between the small and large metal laminae, while the insulating laminae will bridge this gap and partially overlap both the metal laminae. The perforations in all the laminae lie well within the overlapping areas. Preferably the perforations are so spaced radially that even without care in stacking they cannot coincide.

The assembly of the insulator is carried out by forming a stack of the laminae with all the laminae concentric and with each insulating lamina lying over and overlapping one small metal lamina 21 and one large metal lamina 22. The arrangement of the stack is as shown in Figure 7. The stack is then pressed and heated. Since the metal laminae are tinned on both sides they fuse together in adjacent areas which are not separated by insulating laminae 23, i. e. beyond the inner and outer limits of the insulating laminae and in the areas adjacent to the perforations 26 and 27. Similarly the insulating laminae are bonded together in the adjacent areas which are not separated by metal laminae, i. e.

in the annular gap between the large and small metal laminae and in the areas adjacent to the perforations 24 and 25.

As a result of this heating and pressing operation there is produced a bushing insulator as shown in Figure 8 having an insulating body 28 to which are firmly attached an inner metal sleeve 29 and an outer metal sleeve 30.

As will be seen from Figure 8 the perforations produce multiple mechanical interlocking between the metal sleeves and the insulating body. The areas of contact between the insulating body and the metal sleeves are labyrinthine in character.

It will be appreciated that insulators of different shapes can be built up by using laminae of different shapes. By forming the laminae into cones, domes or like three-dimensional figures, conical or dome-shaped insulators can be produced.

While the laminae can be produced in any suitable manner, as by punching or by stamping, it is also possible to make them by techniques such as are employed in the production of printed electric circuits. Details of some such techniques are described in British patent specifications Nos. 639,111, 639,178, 639,658 and 644,565.

Figure 9:
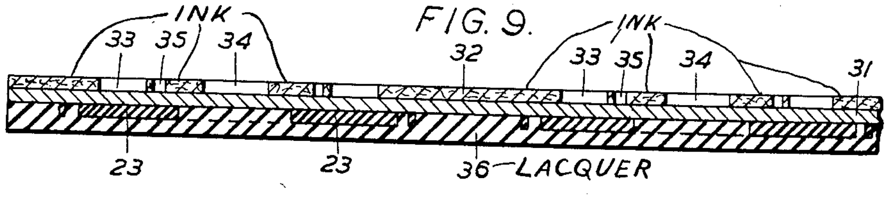
Figure 10:
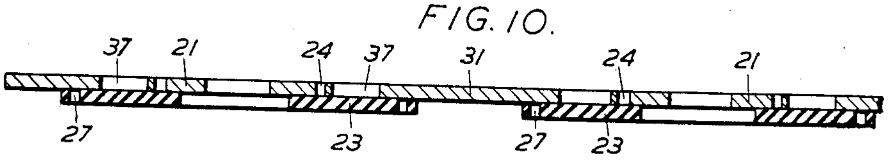
Figure 11:
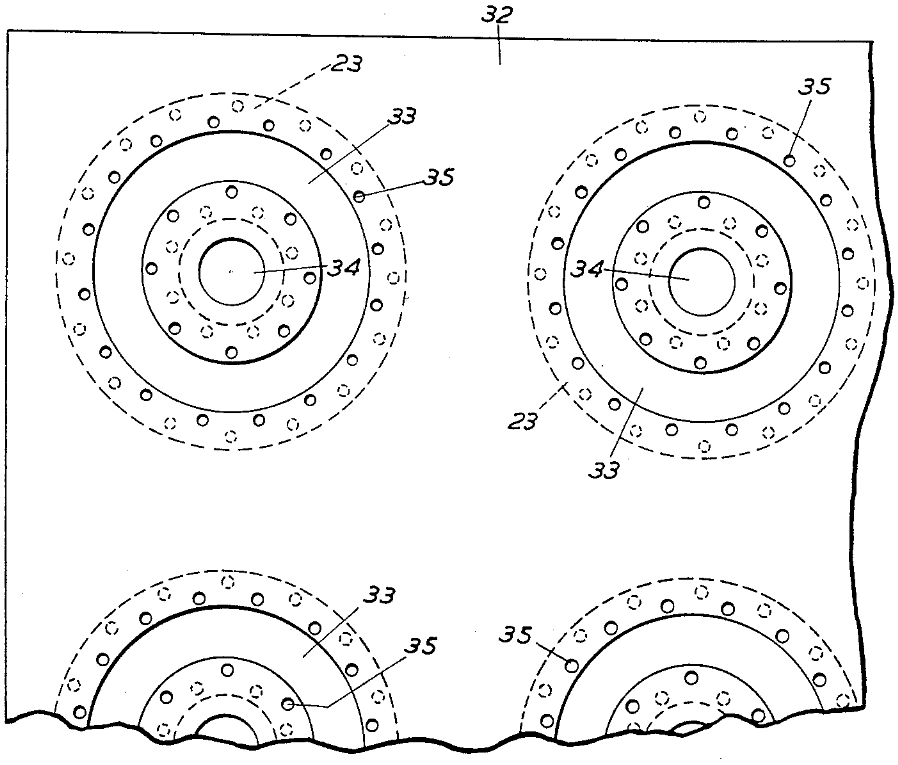

An example of a printed circuit technique for the production of laminae of the kind shown in Figures 4, 5 and 6 will now be described with reference to Figures 9, 10 and 11.

First of all a sheet of metal foil 31 is tinned on both sides and is printed on one side with a repeat pattern of the metal laminae 21 and 22 arranged concentrically. The printing is done in an etch resistant ink 32, which covers the parts of the metal foil that are to form the metal laminae. However, the ink extends beyond the outer bounderies of large metal laminae 22 so that in effect there is an ink coating all over the foil except for the parts 33 which are to constitute the annular gaps between the metal laminae, the parts 34 which are to constitute the bores through the small metal laminae and the parts 35 which are to constitute the perforations in the metal laminae. The parts 33, 34 and 35 which are not covered with ink are shown blank in Figure 9.

On the other side of the foil are printed representations of the insulating laminae, this printing preferably being done with an adhesive or a sticky ink consisting of an uncured or partially cured resin. It is necessary to ensure that the pattern printed on this side of the foil is correctly in register with the pattern for the metal laminae, as shown in dotted lines in Figure 11. While the pattern of the insulating laminae is still sticky this side of the foil is sprayed with flock, for instance glass fibre or asbestos flock suitable treated so that a layer of the flock adheres to the printed parts of the foil. The flock will not adhere to the foil where there is no adhesive or sticky ink. Thus on this side of the foil there will be produced a pattern, in insulating flock, of the required insulating laminae 23.

Next the whole of this side of the foil is painted with a lacquer 36 which can be removed subsequently without affecting the flock insulation. This lacquer coating serves to protect this side of the foil from the acid or other agent used in the subsequent etching process. In the etching process the etching medium can attack only those parts of the foil which are exposed, namely areas 33, 34 and 35 in Figure 11. The etching is continued until all the metal underlying these exposed areas has been removed. Next the etched foil is washed and treated with a neutralising agent for rendering ineffective any residual etching medium. After the washing the ink layer 32 and the lacquer layer 34 are removed. Preferably the ink and lacquer should be soluble in the same solvent which should, of course, have no effect on the adhesive by which the insulating laminae 23 are secured to the foil. The resulting foil will appear in cross section as in Figure 10 with apertures 37 in the foil corresponding to the inside diameters of the large metal laminae and, concentrically disposed therein, the small metal laminae 21. Holding the small metal laminae in place in relation to the apertures 37 are the insulating laminae 23. Many layers of such foils are now superimposed one upon the other with the laminae in register. Preferably alternate sheets are laid at right angles to each other so that the perforations shall not coincide. Alternatively a single sheet of foil can be folded in several folds to obtain the required superimposition of layers. The stack of sheets is then pressed under heat as was described earlier with reference to Figures 4 to 8, and finally the single insulators are punched out of the finished stack. The diameter of the punch is equal to the diameter of the outer metal sleeve.

As a modification of the procedure just described the insulating rings may be pre-formed, as by stamping from a sheet, and fixed to the foil at the proper places, for instance by a labelling machine. This modification permits a wider selection of insulating materials and bonding cements.

Mechanical methods of forming the laminae will generally be preferred for single insulators, but printed circuit techniques have advantages in the case of more complex assemblies, since desired metal interconnections can be produced at the same time as the laminae. By printed circuit techniques it is possible to produce as a single panel a complete cover plate and terminal board for hermetically sealed equipment, e. g. transformers, condensers and rectifiers. Some of the terminals may be merely equivalent to the inner metal sleeve described above, but some may be connected to others by metal connections produced in the printed foil. The outer edge of the panel and some selected terminals may be equivalent to the aforementioned single insulators having an outer metal sleeve. The omission of the outer metal sleeves from other terminals may permit a closer spacing of the insulators and a grouping of terminals according to potential difference which would render the whole panel safer and smaller, besides making its construction cheaper and more convenient.

It will be understood that the employment in the invention of printed circuit techniques as described above is not confined to the manufacture of terminals, terminal panels and the like. Thus, the invention may also be used for the purpose of mechanically reinforcing certain parts in printed circuits such as those produced by the techniques described in British Patents Nos. 639,111, 639,178, 639,658 and 644,565. In such circuits the bond between the metallic pattern and its insulating support may not be so strong as is desirable for certain purposes. For instance, points of attachment of heavy components, switch contacts subject to shearing, pulling of vibratory forces, and circuits subject to rough handling, are examples of cases where metallic parts require to be very firmly bonded to the insulating base, either in particular areas or all over the circuit pattern. By providing multiple laminations of metal and insulation which are interleaved at their abutting edges, or which are perforated in overlapping areas, as described above, the bond between the metal parts and the insulating support can be greatly strengthened.

Figure 12:
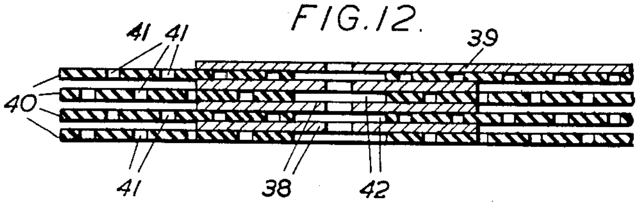
Figures 12 and 13 illustrate the manufacture of a reinforced "printed circuit," the former figure showing a fragment of a stack of printed circuits before heat treatment and the latter figure showing the fragment when completed.
Figure 13:
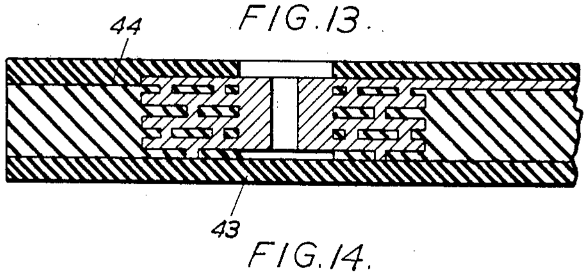

As shown in Figures 12 and 13, the improved bonding of the printed circuit pattern is effected by stacking several thin layers 38 and 39 of printed circuits together. All, or all but one, of the printed circuit layers are produced on thin perforated insulating bases 40. The perforations 41 may be close and regular without regard to the circuit pattern, or the sheet may be perforated only in the areas where a particularly strong bond is required. In the former case a thin regularly perforated sheet material can be used, whereas in the latter case the perforations will have to be made specially in accordance with the individual patterns. In the conductive portions of the circuit there will be areas of metal foil 38 and 39, and underneath these areas the insulating base may be removed as at 42, except in the marginal areas. The said perforations 41 will, of course, be present in these marginal areas beneath the edges of the metal foil pattern.

Of the several layers which are to be superimposed, only one need carry a complete metal circuit 39, the others having metal foil 38 only in the areas which are to be mechanically reinforced. These may be termed the terminal areas. The layers are stacked so that the centres of the terminal areas are in register but so that the said small perforations 41 in adjacent neighboring insulating layers 40 do not coincide; provision may be made in the design of the layers to prevent such coincidence of the perforations. The stack of layers is then subjected to heat and pressure for soldering the superimposed 38 and 39 foils together through the openings 41 and 42 in the interleaving insulating layers 40 and for consolidating the insulating layers 40 in regions which are not covered by foil or through perforations in the foils. This treatment consolidates the stack into a strong unit as shown in Figure 13. If desired the completed unit may be fixed to an insulating base sheet 43, or covered by a protective coating or cover sheet 44 leaving only the terminal areas exposed, or both these expedients may be adopted.

Figure 14:
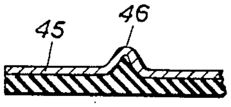
Figure 14 is a section through a portion of a printed circuit in which the metallic pattern is provided with an embossed portion.

For special purposes as shown in Figure 14 the metallic pattern 45 may be embossed or otherwise treated for raising some portions 46 above the level of the others, for example for locating purposes in assembly or use, or for improvement of the Q value of inductive patterns such as spirals. Such embossing may also serve to stiffen the foils and so to increase the rigidity of the product and the strength of the bond between foil and insulator at the periphery of the embossed areas.

Figure 15:
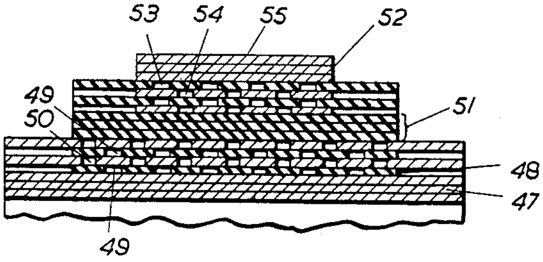
Figure 15 and 16 illustrate the manufacture of a particular form of bushing insulator having cylindrical inner and outer metal sleeves separated by an insulating sleeve, the former figure showing a section of the stack before heat treatment and the latter figure showing a similar section of the completed insulator.
Figure 16:
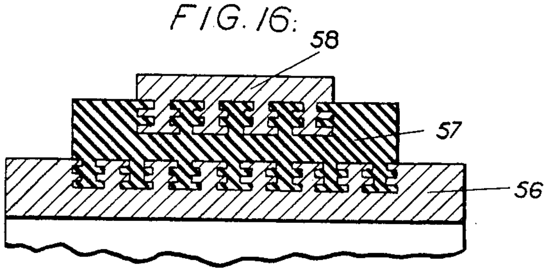

The manufacture of a bushing insulator illustrated in Figures 15 and 16 is in some respects similar to that illustrated in Figures 1, 2 and 3 in that it involves a winding operation. First of all several layers of a strip of tinned metal foil 47 are wound upon a mandrel or former. After several turns have been applied, a strip of impregnated insulating material 48 is inserted under the foil strip 47. The insulating strip 48 is narrower than the foil strip 47 so that the foil strip projects beyond the edges of the insulating strip at both sides. The portion of the insulating strip that is first inserted is provided with a series of perforations 49. The end of the metal foil strip 47 which overlaps the insulating strip 48 is similarly perforated with perforations 50, but the perforations 49 and 50 are staggered so that they cannot come into register with one another. The two strips are wound together for a few more turns until the end of the foil strip 47 is reached. The perforations 50 in the insulating strip may now cease if desired, and the insulating strip is wound on further for several turns 51. Another strip of tinned foil 52, which is narrower than the insulating strip 48, is then interleaved with the insulating strip in a similar manner to that in which the inner end of the insulating strip was interleaved with the metal foil strip 47. Perforations 53 and 54 are provided in the overlapping portions of the insulating strip 48 and the metal foil strip 52 respectively. When the end of the insulating strip 48 is reached the foil strip 52, which need not be further perforated, is wound on for a few more turns, the outer turn 55 being secured to the underlying turn by applying a soldering iron. The assembly is now subjected to heat and pressure which unites together parts of the foil strips which are not separated by insulation, and parts of the insulating strip which are not separated by metal foil. In the interleaved portions the unions are effected through the perforations in the intervening strips. The result, which is shown in Figure 16, comprises three solid bodies effectively keyed and sealed together, namely a long inner metal sleeve 56, a shorter intermediate insulating sleeve 57, and an outer metal sleeve 58 which is shorter than the insulating sleeve 57.

As an alternative to heat treatment for uniting the insulating laminae of the stack, it is possible to use only pressure, or time, or, say, ultra-violet light, by using insulating strips containing a pressure-sensitive adhesive or a cement with a chemical accelerator or a resin requiring polymerising methods or means other than prolonged heating.

The metal laminae may be united more speedily by passing an electric current through them.

Heat treatment is the preferred method, but wherever there is a risk that the metallic parts of the insulator may be subjected, during the assembly of the equipment of which they will form part, to a temperature which may, even though only temporarily, melt the solder uniting the metal laminae, it is desirable that the uniting of the metal laminae should be effected, at least in the outer layers, in a heat-proof manner, such as by welding. Alternatively the foils may be tinned with a higher melting alloy, such as is used for hard soldering. The insulation will, in most cases, consist of a stack of laminae bonded by thermo-setting compounds, and will normally be adequately stable at such temperatures.

What I claim as my invention and desire to secure by Letters Patent is:

1. A metallised insulator comprising an insulating body and a metal body, said insulating body being composed of insulating laminae in direct insulation-to-insulation contact over parts of their areas and said metal body being composed of metal laminae in direct metal-to-metal contact over parts of their areas, other parts of said insulating laminae and other parts of said metal laminae being disposed in a mutually interleaved relationship in direct laminae-to-laminae contact to provide labyrinthic engagement between said metal body and said insulating body.

2. A metallised insulator as claimed in claim 1 in which at least some of the laminae are formed with perforations and the laminae adjacent to both sides of a perforated lamina are united through the perforations in said lamina.

3. A metallised insulator according to claim 1, wherein said insulating laminae and said metal laminae are alternately stacked, each metal lamina comprising a metal ring and each insulating lamina comprising an insulation ring, the inner periphery of the insulation rings overlapping the outer periphery of the adjacent metal rings, the areas of all the metal rings protruding from the insulation rings being in direct metal-to-metal contact, the areas of all the adjacent insulating rings protruding from the metal rings being in direct insulation-to-insulation contact and all the overlapping areas of the metal and insulating rings being in direct insulation-to-metal contact.

4. A metallised insulator according to claim 1, wherein said insulating laminae and said metal laminae are alternately stacked, each metal lamina comprising two concentrically and radially spaced rings and each insulating lamina comprising a ring overlapping the adjacent inner and outer metal rings, the inner and outer protruding areas of all the metal rings being in direct metal-to-metal contact, the areas of adjacent insulating rings intermediate said metal rings being in direct insulation-to-insulation contact and the overlapping areas of the metal and insulating rings being in direct insulation-to-metal contact.

5. A metallised insulator according to claim 1, wherein at least some of the metal laminae include raised portions.

6. A metallised insulator according to claim 1, wherein at least one of said metal laminae is in form of a conductive pathway pattern.

7. A method of making a metallised insulator, which comprises securing to one side of metal foil a thin pattern of insulation material partly covering the foil, forming on the other side of the metal foil a pattern of desired metal laminae, said metal laminae pattern and said insulating material pattern partly overlapping, removing unwanted areas of the metal foil on the side bearing the insulating material pattern to form an element consisting of an insulating lamina secured to a metal lamina with parts of the metal lamina left uncovered by the insulating lamina and parts of the insulating lamina left uncovered by the metal lamina, forming a plurality of such elements into a stack with metal and insulating laminae alternating, and treating said stack so as to unite areas of the metal laminae other than those separated by insulating laminae in direct metal-to-metal contact and to unite areas of the insulating laminae other than those separated by metal laminae in direct insulation-to-insulation contact.

8. The method according to claim 7 in which the respective areas of the laminae are united by tinning the metal laminae and coating the insulating laminae with a resinous binder, and by applying heat and pressure to said stack.

9. The method according to claim 7 in which at least some of the laminae are formed with perforations and the insulating laminae are pressed into direct insulation-to-insulation contact through said perforations.

10. A method of making a metallised insulator which comprises securing to one side of metal foil a thin pattern of insulating material partly covering the foil, forming on the other side of the foil in an etch resist a pattern of desired metal laminae, said etch resist pattern and said insulating material pattern partially overlapping, applying a protective coating to at least the exposed areas of the metal foil on the side bearing the insulating material pattern, etching the coated foil to remove unwanted areas of said foil for forming an element consisting of an insulating lamina secured to a metal lamina with parts of the metal lamina left uncovered by the insulating lamina and parts of the insulating lamina left uncovered by the metal lamina, forming a plurality of such elements into a stack with metal and insulating laminae alternating, and treating said stack so as to unite areas of the metal laminae other than those separated by insulating laminae in direct metal-to-metal contact and to unite areas of the insulating laminae other than those separated by metal laminae in direct insulation-to-insulation contact.

References Cited in the file of this patent

UNITED STATES PATENTS

| | | |
|---|---|---|
| 1,961,663 | Lahey | June 7, 1932 |
| 1,917,929 | Duffy | July 11, 1933 |
| 2,065,561 | Boyle et al. | Dec. 29, 1936 |
| 2,075,373 | Tomec | Mar. 30, 1937 |
| 2,179,381 | Palmateer | Nov. 7, 1939 |
| 2,186,050 | Vaughn | Jan. 9, 1940 |
| 2,350,887 | Goff | June 6, 1944 |
| 2,372,645 | Barmack | Apr. 3, 1945 |
| 2,435,889 | Kerridge | Feb. 10, 1948 |
| 2,450,532 | Tognola | Oct. 5, 1948 |
| 2,492,236 | Mydlil | Dec. 27, 1949 |
| 2,501,164 | Durst | Mar. 21, 1950 |
| 2,547,022 | Leno | Apr. 3, 1951 |
| 2,632,722 | Libberton | Mar. 24, 1953 |

FOREIGN PATENTS

| | | |
|---|---|---|
| 305,694 | Great Britain | Feb. 8, 1929 |
| 537,688 | Great Britain | July 2, 1941 |